United States Patent [19]

Beer et al.

[11] Patent Number: 5,046,678
[45] Date of Patent: Sep. 10, 1991

[54] BINDING TAPE REEL HAVING A TAPE CLEANING TOOL

[75] Inventors: Ted A. Beer, Rochester; Geoffrey C. Williams, Penfield, both of N.Y.

[73] Assignee: Xerox Corporation, Stamford, Conn.

[21] Appl. No.: 248,705

[22] Filed: Sep. 26, 1988

[51] Int. Cl.5 .......................................... B65H 75/18
[52] U.S. Cl. ..................................... 242/71.8; 15/100
[58] Field of Search ................. 355/200, 324; 242/77, 242/77.3, 55.55, 71.8; 15/100; 352/130

[56] References Cited

U.S. PATENT DOCUMENTS

| | | | |
|---|---|---|---|
| 1,368,991 | 2/1921 | Sims | 242/77.3 |
| 1,599,504 | 9/1926 | Underwood | 242/77.3 |
| 2,487,479 | 11/1949 | Roehrl | 15/100 UX |
| 2,503,374 | 4/1950 | Bureau | 242/77.3 |
| 2,561,288 | 7/1951 | Panzer | 242/77.3 |
| 2,853,175 | 9/1958 | Regentrop et al. | 197/175 |
| 3,002,707 | 10/1961 | Noble | 242/68.3 |
| 3,481,551 | 12/1969 | Steelman | 242/71.8 X |
| 4,165,526 | 8/1979 | Jones | 15/100 X |
| 4,436,224 | 3/1984 | McInerny | 242/55.55 X |
| 4,797,048 | 1/1989 | Doery | 355/324 X |

Primary Examiner—Fred L. Braun
Attorney, Agent, or Firm—H. Fleischer; J. E. Beck; R. Zibelli

[57] ABSTRACT

A reel on which a supply of binding tape is mounted. The reel has a hub adapted to be mounted on a shaft with at least one flange extending radially outwardly therefrom. The flange is adapted to engage a braking member to maintain the binding tape unwinding from the reel under tension as the reel rotates. The flange is mounted in a core of the reel with a pair of opposed, spaced frames extending radially outwardly from the core. The binding tape is wound about the core between the frames. A tape cleaning tool is molded integrally with the hub. The tool is molded operator removable from the hub and facilitates cleaning of the tape guides during routine maintenance.

6 Claims, 4 Drawing Sheets

BINDING TAPE REEL HAVING A TAPE CLEANING TOOL

This invention relates generally to a binding apparatus used in an electrophotographic printing machine, and more particularly concerns a reel used in the binding apparatus for storing a supply of binding tape thereon.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In a high speed commercial printing system of the foregoing type, the copy sheets with the information permanently affixed thereto, are transported to a finishing station. After the requisite number of sheets, corresponding to a set of original documents is compiled in the finishing station, the copies of the set are permanently affixed to one another to form a booklet thereof. Most frequently, a stapling apparatus is employed to secure the sheet to one another to form the booklet. However, other alternative techniques have been used such as adhesively binding the sheets to one another. In order for each set of copy sheets to have a bound finished appearance, it is desirable to adhesively secure the sheets of the set to one another. Often, the printing machine employs a recirculating document handling system to advance successive original documents from a stack thereof to the exposure station of the electrophotographic printing machine for reproduction. When a recirculating document handling system is employed, the printing system produces a large number of copies rapidly. This type of system may be used to form sets or booklets of copy sheets. The copy sheets are collected and adhesive is applied to the spine to bind the sheets together into sets of copy sheets. The adhesively bound sets of copy sheets are then stacked for presentation to the machine operator. Numerous methods are known in the art for adhesively securing sheets to one another. For example, a liquid adhesive may be applied to the spine of a moving set of copy sheets, or the copy sheets may be stationary and a container having a supply of adhesive therein may be moved along the spine to apply the adhesive thereon. Alternatively, a tape having an adhesive on one surface thereof may be positioned in contact with the spine and heat applied thereto so as to cause the adhesive to flow between the sheets in the region of the spine securing the sheets together. In order to maintain the printing machine operating at high efficiency with minimum loss of productivity, it is necessary to supply a large volume of binding tape. In conflict with the requirement to provide a large tape supply is the necessity to minimize storage space. In order to optimize storage of a supply of binding tape, the binding tape is stored on a reel. Various types of reels have hereinbefore been used. The following disclosures appear to be relevant:

U.S. Pat. No. 2,853,175
Patentee: Regentrop et al.
Issued: Sept. 23, 1958

U.S. Pat. No. 3,002,707
Patentee: Noble
Issued Oct. 3, 1961

The relevant portions of the foregoing patents may be summarized as follows:

U.S. Pat. No. 2,853,175 discloses a molded typewriter spool having radial recesses extending from a central cylindrical opening provided for mounting the spool on a carrier pin and for guiding and controlling the rotation of the spool.

U.S. Pat. No. 3,002,707 describes a reel mounting system using a quick mount lockable shaft. Small tabs on the shaft positively hold the reel with the reel having two different center hole diameters for alignment.

In accordance with one aspect of the present invention, there is provided a reel for storing a supply of binding tape. The reel has a hub adapted to be mounted on a shaft. At least one flange extending radially outwardly from the hub is adapted to engage a braking member to maintain the binding tape unwinding from the reel under tension as the reel rotates. Means, defining an aperture having the flange mounted therein, support a supply of binding tape.

Pursuant to another aspect of the features of the present invention, there is provided an electrophotographic printing machine of the type in which successive copy sheets having indicia recorded thereon are compiled into sets and the sheets of each set are bound together by applying a binding tape to one edge of the set with a supply of binding tape being stored on a reel of a binder. The improved reel includes a hub adapted to be mounted on a shaft. At least one flange extending radially outwardly from the hub is adapted to engage a braking member to maintain the binding tape unwinding from the reel under tension as the reel rotates. Means, defining an aperture having said flange mounted in the opening therein, support a supply of binding tape.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

Figure 1:
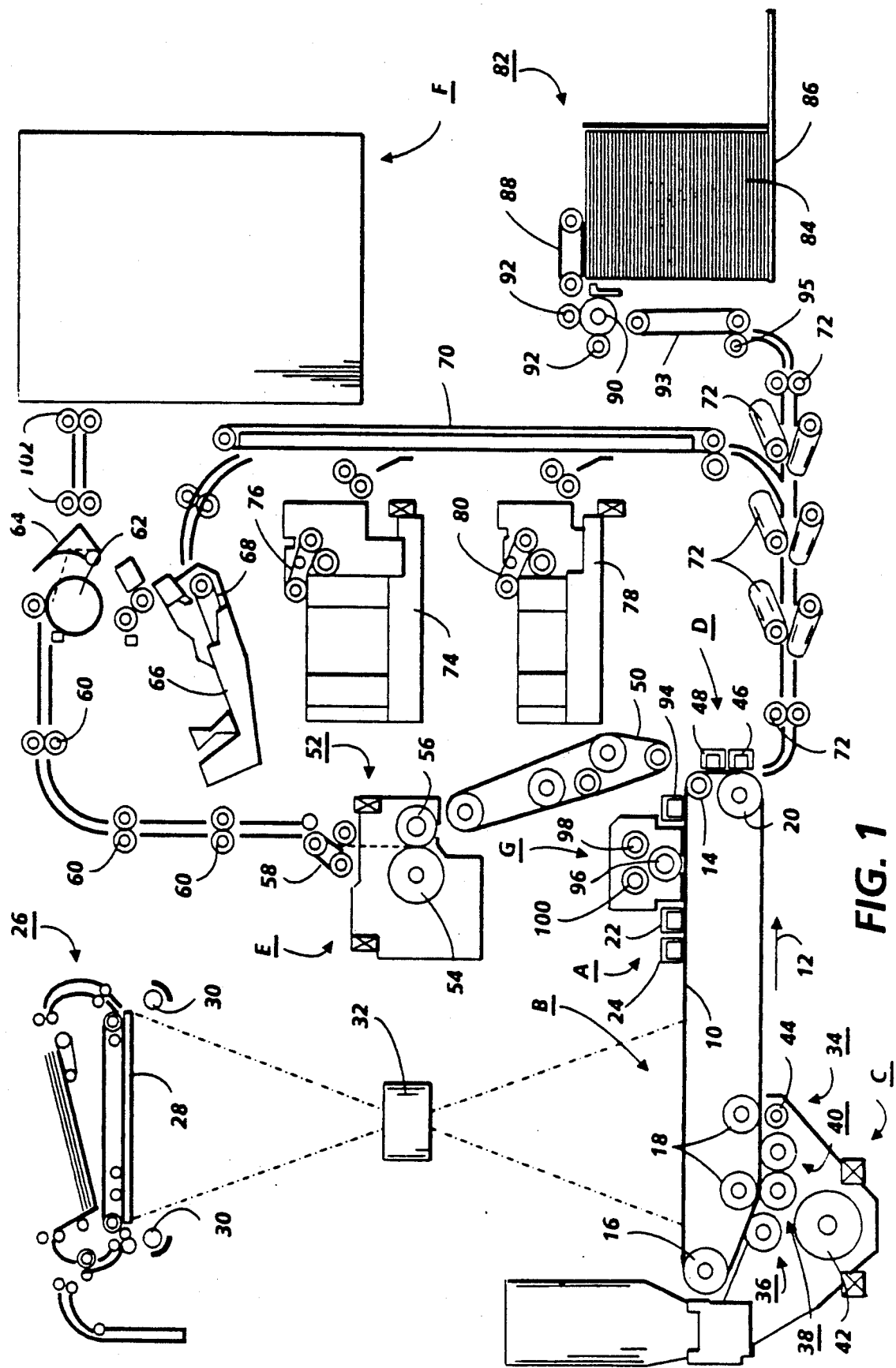
FIG. 1 is a schematic elevational view depicting an illustrative electrophotographic printing machine incorporating a finishing station having a binder with the binding reel of the present invention therein.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the binding reel of the present invention may be employed in a wide variety of devices and is not specifically limited in its application to the particular embodiment depicted herein.

Referring to FIG. 1 of the drawings, the electrophotographic printing machine employs a photoconductive belt 10. Preferably, the photoconductive belt 10 is made from a photoconductive material coated on a ground layer, which, in turn, is coated on a anti-curl backing layer. The photoconductive material is made from a transport layer coated on a generator layer. The transport layer transports positive charges from the generator layer. The interface layer is coated on the ground layer. The transport layer contains small molecules of di-m-tolydiphenylbiphenyldiamine dispersed in a polycarbonate. The generation layer is made from trigonal selenium. The ground layer is made from a titanium coated MYLAR. The ground layer is very thin and allows light to pass therethrough. Other suitable photoconductive materials, ground layers, and anti-curl backing layers may also be employed. Belt 10 moves in the direction of arrow 12 to advance successive portions of the photoconductive surface sequentially through the various processing stations disposed about the path of movement thereof. Belt 10 is entrained about stripping roller 14, tensioning roller 16, idler rollers 18, and drive roller 20. Stripping roller 14 and idler rollers 18 are mounted rotatably so as to rotate with belt 10. Tensioning roller 16 is resiliently urged against belt 10 to maintain belt 10 under the desired tension. Drive roller 20 is rotated by a motor coupled thereto by suitable means, such as a belt drive. As roller 20 rotates, it advances belt 10 in the direction of arrow 12.

Initially, a portion of the photoconductive surface passes through charging station A. At charging station A, two corona generating devices, indicated generally by the reference numerals 22 and 24 charge photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of photoconductive belt 10 is advanced through imaging station B. At imaging station B, a document handling unit, indicated generally by the reference numeral 26, is positioned over platen 28 of the printing machine. Document handling unit 26 sequentially feeds documents from a stack of documents placed by the operator in the document stacking and holding tray. The original documents to be copied are loaded face up in the document tray on top of the document handling unit. A document feeder located below the tray forwards the bottom document in the stack to rollers. The rollers advance the document onto platen 28. When the original document is properly positioned on platen 28, a belt transport is lowered onto the platen with the original document being interposed between the platen and the belt transport. After imaging, the original document is returned to the document tray from platen 28 by either of two paths. If a simplex copy is being made or if this is the first pass of a duplex copy, the original document is returned to the document tray via the simplex path. If this is the inversion pass of a duplex copy, then the original document is returned to the document tray through the duplex path. Imaging of a document is achieved by two Xenon flash lamps 30 mounted in the optics cavity which illuminate the document on platen 28. Light rays reflected from the document are transmitted through lens 32. Lens 32 focuses light images of the original document onto the charged portion of the photoconductive surface of belt 10 to selectively dissipate the charge thereon. This records an electrostatic latent image on photoconductive belt 10 which corresponds to the informational areas contained within the original document. Thereafter, photoconductive belt 10 advances the electrostatic latent image recorded thereon to development station C.

At development station C, a magnetic brush developer unit, indicated generally by the reference numeral 34, has three developer rolls, indicated generally by the reference numerals 36, 38 and 40. A paddle wheel 42 picks up developer material and delivers it to the developer rolls. When developer material reaches rolls 36 and 38, it is magnetically split between the rolls with half of the developer material being delivered to each roll. Photoconductive belt 10 is partially wrapped about rolls 36 and 38 to form extended development zones. Developer roll 40 is a cleanup roll. Magnetic roll 44 is a carrier granule removal device adapted to remove any carrier granules adhering to belt 10. Thus, rolls 36 and 38 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detach the copy sheet from belt 10. Conveyor 50 advances the copy sheet to fusing station E.

Fusing station E includes a fuser assembly, indicated generally by the reference numeral 52 which permanently affixes the transferred toner powder image to the copy sheet. Preferably, fuser assembly 52 includes a heated fuser roller 54 and a pressure roller 56 with the powder image on the copy sheet contacting fuser roller 54. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 58. Decurler 58 bends the copy sheet in one direction to put a known curl in the copy sheet and then bends it in the opposite direction to remove that curl.

Forwarding rollers 60 then advance the sheet to duplex turn roll 62. Duplex solenoid gate 64 guides the sheet to the finishing station F or to duplex tray 66. The details of finishing station F will be described hereinafter with reference to FIG. 2. Duplex solenoid gate 64 diverts the sheet into duplex tray 66. The duplex tray 66 provides an intermediate or buffer storage for those sheets that have been printed on one side and on which an image will be subsequently printed on the second, opposed side thereof, i.e. the sheets being duplexed. The sheets are stacked in duplex tray 66 face down on top of one another in the order in which they are copied.

In order to complete duplex copying, the simplex sheets in tray 66 are fed, in seriatim, by bottom feeder 68 from tray 66 back to transfer station D via conveyor 70 and rollers 72 for transfer of the toner powder image to the opposed sides of the copy sheets. Inasmuch as successive bottom sheets are fed from duplex tray 66, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from the secondary tray 74. The secondary tray 74 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 76. Sheet feeder 76 is a friction retard feeder utilizing a feed belt and take-away rolls to advance successive copy sheets to transport 70 which advances the sheets to rolls 72 and then to transfer station D.

Copy sheets may also be fed to transfer station D from the auxiliary tray 78. The auxiliary tray 78 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 80. Sheet feeder 80 is a friction retard feeder utilizing a feed belt and take-away rolls to advance successive copy sheets to conveyor 70 which advances the sheets to rolls 72 and then to transfer station D.

Secondary tray 74 and auxiliary tray 78 are secondary sources of copy sheets. A high capacity feeder, indicated generally by the reference numeral 82, is the primary source of copy sheets. High capacity feeder 82 includes a tray 84 supported on an elevator 86. The elevator is driven by a bidirectional motor to move the tray up or down. In the up position, the copy sheets are advanced from the tray to transfer station D. A vacuum feed belt 88 feeds successive uppermost sheets from the stack to a take away drive roll 90 and idler rolls 92. The drive roll and idler rolls guide the sheet onto transport 93. Transport 93 and idler roll 95 advance the sheet to rolls 72 which, in turn, move the sheet to transfer station station D.

Invariably, after the copy sheet is separated from the photoconductive surface of belt 10, some residual particles remain adhering thereto. After transfer, photoconductive belt 10 passes beneath corona generating device 94 which charges the residual toner particles to the proper polarity. Thereafter, a precharge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 96 and two de-toning rolls 98 and 100, i.e. waste and reclaim de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the the rear of cleaning station G.

The various machine functions are regulated by a controller. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the documents and the copy sheets. In addition, the controller regulates the various positions of the gates depending upon the mode of operation selected.

Figure 2:
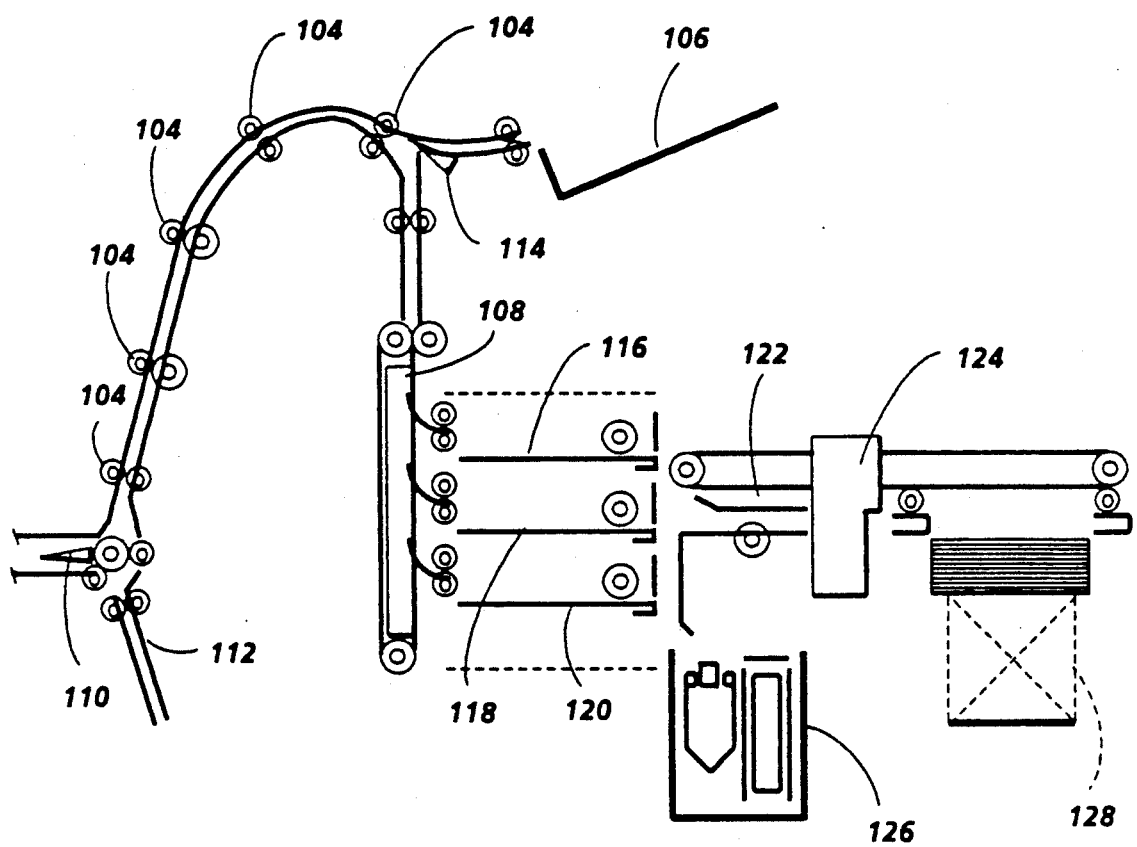
FIG. 2 is a schematic elevational view showing the finishing station of the FIG. 1 printing machine with the binder having the binding reel.

Referring now to FIG. 2, the general operation of finishing station F will now be described. Finishing station F receives fused copies from rolls 102 (FIG. 1) and delivers them to solenoid actuated gate 110. Gate 110 diverts the copy sheet to either registration rolls 104 or inverter 112. A tri-roll nip is used to drive sheets into and out of the inverter. Inverter 112 has a compression spring which assists in reversing the direction of the sheets and assists in driving them out of the inverter. Inverter 112 is driven by a reversible AC motor. Two cross roll registration nips are used to r... ster the sheets. The cross roll registration nips are dr... a by the sheet path drive motor. Rolls 104 advance the copy sheets to gate 114. Gate 114 diverts the sheets to either the top tray 106 or to vertical transport 108. Vertical transport 108 is a vacuum transport which transports sheets to any one of three bins 116, 118 or 120. Bins 116, 118, and 120 are used to compile and register sheets into sets. The bins are driven up or down by a bidirectional AC bin drive motor adapted to position the proper bin at the unloading position. A set transport 122 has a pair of set clamps mounted on two air cylinders and driven by four air valve solenoids. Two of the air valves are used for positioning the set transport and two are used for the retract function. The set transport is used to transport sets from the bins to sheet stapling apparatus 124, binder 126 and sheet stacker 128. The stapled, bound, or unfinished sets are delivered to stacker 128 where they are stacked for delivery to the operator.

Figure 3:
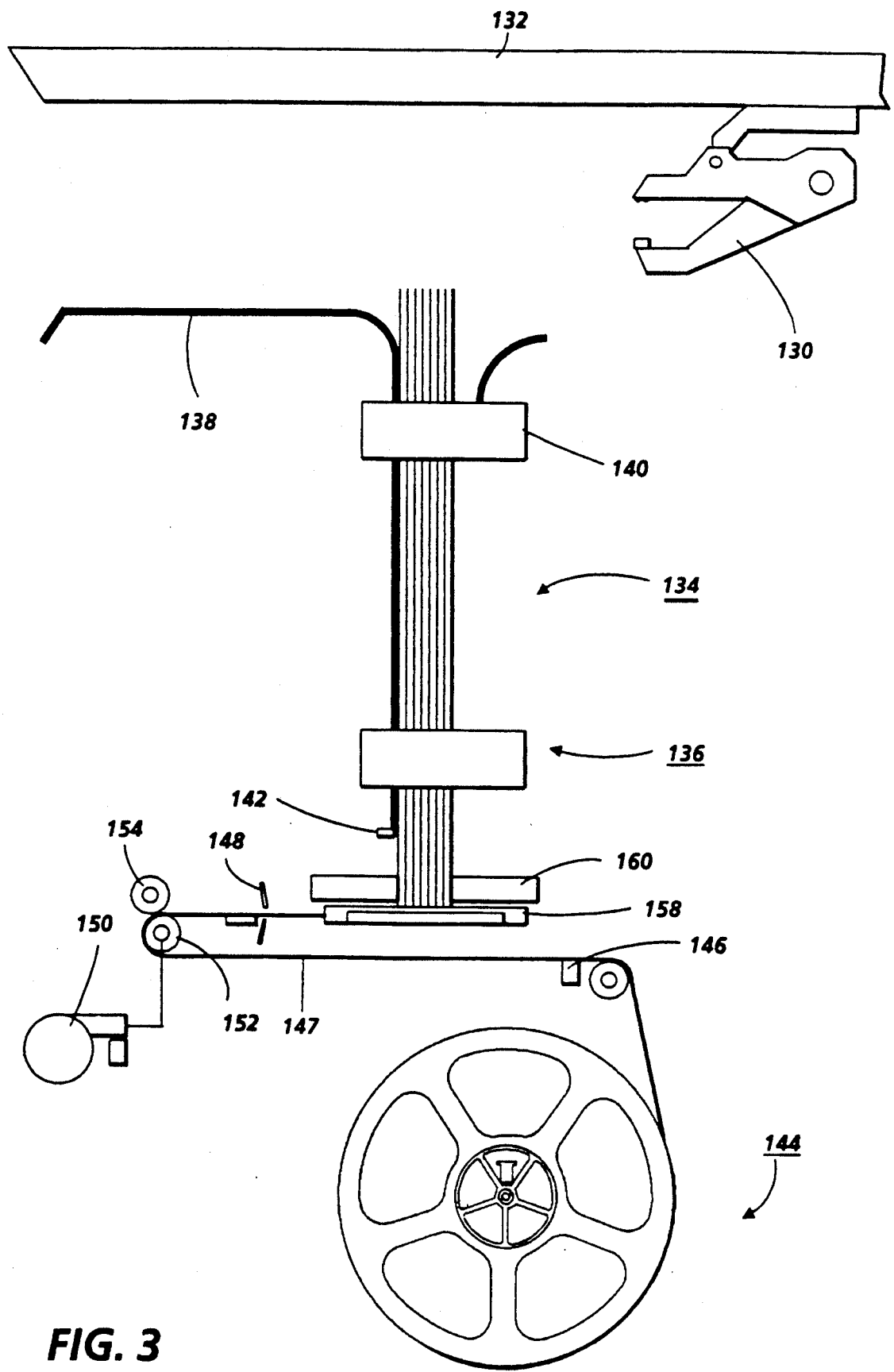
FIG. 3 is a schematic elevational view further illustrating the FIG. 2 binder with the binding reel.

Turning now to FIG. 3, there is shown the general operation of the sheet binding apparatus in the finishing station station. As shown, set clamp 130 is mounted on a set transport carriage 132 and pneumatically driven by a compressor. Set clamp 130 removes sets from bins 116, 118 and 120. These sets are delivered to binding apparatus 126. Set clamp 130 transports the set of copy sheets to a tilt bed, indicated generally by the reference numeral 134, of binding apparatus 126. Tilt bed 134 receives the set of copy sheets 136 from set clamp 130 and positions the set of copy sheets 134 for the binding operation. Tilt bed 134 accepts sets of copy sheets 136 from set clamp 130, with the spine, i.e. the edge to be bound, leading, and controls the position of the set of copy sheets 136 during the binding operation. Tilt bed 136 includes a guide structure 138 with dual clamps 140 mounted thereon. Clamps 140 are spaced from one another and hold the set of copy sheets on guide structure 138. The clamping action of clamps 140 is pneumatically driven through a solenoid. The required air pressure is provided by the Finisher compressor. Guide structure 138 is mounted on a pivoting shaft which allows it to rotate from a horizontal position to a vertical position. The guide structure 138 is oriented in a horizontal position to receive the set of copy sheets and pivots to the vertical position to initiate the binding operation. When tilt bed 134 is in the vertical position, the two binder flappers on either side of the binder head, move in an upwardly direction to form a channel, or U-shaped opening. Tilt bed 134 is moved in a downward direction until the lower portion of guide structure 138 engages a mechanical stop 142. A sensor, preferably a light emitting diode and photodiode, detects the presence of the guide structure against stop 142 and de-energizes the motor moving the tilt bed in a downwardly direction. The set of copy sheets is positioned in the U-shaped opening with edge thereof abutting bind head. At this time, clamps 140 opens and the edge of the set of copy sheets is registered on the binder head. After registration of the copy sheets is completed, clamps 140 of tilt bed 134 close and the tilt bed moves in a vertically upward direction to space the spline of set 142 from platen and a tape 149 having adhesive on one surface thereof is interposed between the heated platen and the spine of set 136. At this time, a strip of binding tape 149 is advanced from a supply thereof wound about a binding reel, indicated generally by the reference numeral 144. Tape 149 is maintained under tension by applying a braking torque on reel 144. The brake rotor driving dog engages the reel in the region provided to achieve this. Out of tape sensor 146 determines if there is still tape on reel 144. Preferably, tape sensor 146 is a photosensor. If photosensor 146 indicates that presence of binding tape, the binding tape 149 is cut by cutter 148. The binding tape 149 is advanced from reel 144 by a bi-directional stepper motor 150 rotating drive roll 152. Tape 149 advances through the nip defined by drive roll 152 and idler roll 154 to tape guide 158. The flappers lower in preparation for receiving the adhesive binding tape. Stepper motor 150 advances a length of tape corresponding to the length of the copy sheet edge having the tape applied thereon. The tape is then fed into tape guide 158, cut to size, and positioned in tape guide 158. Tape guide 158 is then moved over the binding head and flappers. At this time, calipers 160 press against the sides of the set of copy sheets. After the tape is positioned over the platen and flappers, the motion of tape guide 158 moves stop 142 upwardly to the second position. In the second position, stop 142 engages the lower end of guide structure 138 with the edge of set 136 pressed into the softened adhesive on tape 149. Another sensor, preferably a light emitting diode and a photodiode, detects when the end of guide structure 138 engages stop 142 and de-energizes the motor moving tilt bed 134 downwardly. Calipers 160 are disengaged from the set of copy sheets and the flapper move in a vertically upward direction to bend tape 149 so that the adhesive side thereof presses against opposed outermost sheets of the set of copy sheets. In this way, the adhesive tape is fixed to the spine of the set of copy sheets. After the adhesive tape is applied on the spine of the set of copy sheets, the flappers are retracted and the tilt bed moves in a vertically upward direction to space the bound set of copy sheets from the binder head. Tilt bed 134 then rotates 90° in a counter clockwise direction to position the set of copy sheets in a substantially horizontal orientation. Set clamp 130 then receives the bound edge of the set of copy sheets and transports the set of copy sheets to stacker 128 for subsequent removal from the finishing station by the machine operator. The foregoing is more fully described in co-pending U.S. patent application Ser. No. 125,517, filed Nov. 25, 1987 now U.S. Pat. No. 4,828,645, and co-pending U.S. patent application Ser. No. 125,518, filed Nov. 25, 1987, now abandoned, the relevant portions thereof being hereby incorporated into the present application.

Figure 4:
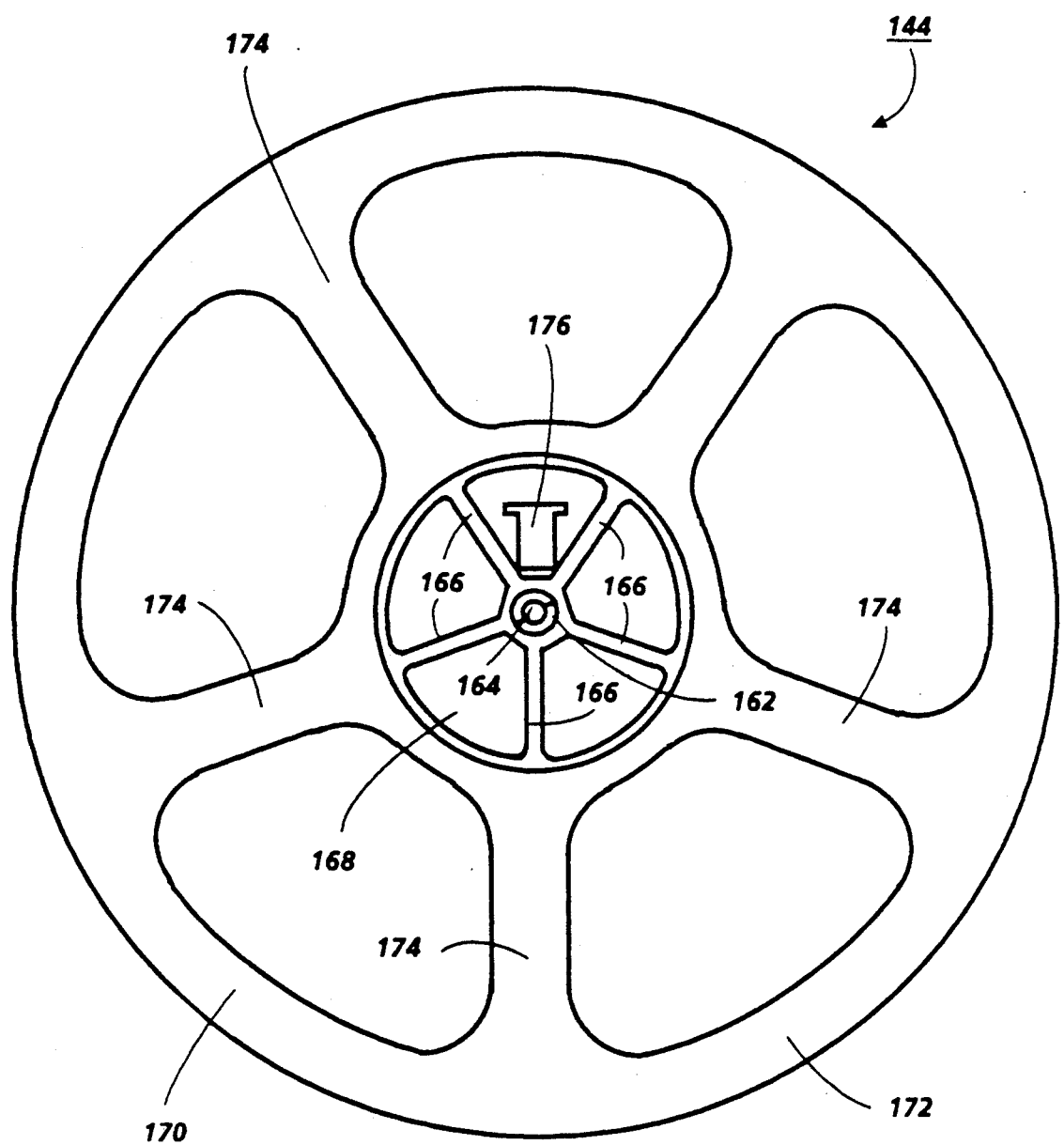
FIG. 4 is a schematic elevational view showing the binding reel of the present invention.

Referring now to FIG. 4, there is shown reel 144 in greater detail. As shown thereat, reel 144 is made preferably from a molded plastic material, e.g. a polyamide material. Reel 144 has a hub 162 with a tapered bore 164 adapted to be mounted on the end of a tapered shaft. This insures that the operator cannot install the rell in the wrong orientation on the shaft. A plurality of flanges 166 extend radially outwardly from hub 162. Flanges 166 are equally spaced from one another and mounted in core 168. The brake rotor driving dog engages the reel at one of the flanges to apply a braking torque on the reel maintaining the tape under tension. A pair of opposed spaced frames, indicated generally by the reference numeral 170, extend radially outwardly from core 168. The binding tape is wound about core 168 in the space between the frames. Each the frames are identical to one another and have a substantially circular rim 172. A plurality of substantially equally spaced webs 174 extending radially outwardly from core 168 connect rim 172 to core 168. A tape cleaning tool 176 is molded integrally with hub 162. Tool 176 extends radially outwardly from hub 162 between adjacent flanges 166. Cleaning tool 176 is molded with a break line between itself and hub 162, This readily enables the machine operator to break off cleaning tool 176 and slide it inside tape guide 158 on a routine basis. In this way, the cleaning tool removes any residual dirt particles and excess glue from the tape guide 158. By molding a cleaning tool on each reel, the operator always has access to the tool with each new reel of tape. The reel is designed to be discarded after the binding tape has been depleted therefrom Typically, the reel stores a supply of binding tape sufficient for about 450 binds using a tape 11 inches in length.

In recapitulation, the binding reel of the present invention is molded and has a tapered bore which mates with a tapered end of a shaft to insure that the reel is mounted correctly thereon. As the binding tape is unwound from the reel, tape, tension is maintained by having the driving dog of the brake rotor of a brake engage the flange extending outwardly from the hub having the tapered bore. In order to optimize operability, a tape cleaning tool is molded integrally with the hub. The tool is molded operator removable from the hub and facilitates cleaning of the tape guides during routine maintenance.

It is, therefore, evident that there has been provided, in accordance with the present invention, a binding reel that fully satisfies the aims and advantages hereinbefore set forth. While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A reel for storing a supply of binding tape, including a cleaning member molded integrally with the reel so as to be transportable therewith, said cleaning member having a weakened region so as to be readily operator breakable at the weakened region enabling the operator to remove said cleaning member from the reel to clean the tape.

2. A reel according to claim 1, further including:
   a hub adapted to be mounted on a shaft, said cleaning member being molded integrally with said hub;
   at least one flange extending radially outwardly from said hub and being adapted to engage a braking member to maintain the binding tape unwinding from the reel under tension as the reel rotates; and
   means, defining an aperture having said flange mounted in the opening therein, for supporting a supply of binding tape.

3. A reel according to claim 2, wherein said hub has a tapered bore adapted to be mounted on a tapered shaft end.

4. A reel according to claim 3, wherein said supporting means includes:
   a core having said flange mounted therein; and
   a pair of opposed spaced frames extending radially outwardly from said core with the binding tape being wound about said core between said opposed spaced frames.

5. A reel according to claim 4, wherein each one of said pair of frames includes:
   a substantially circular rim; and
   a plurality of spaced webs coupling said rim to said core.

6. A reel according to claim 5, further including a plurality of flanges mounted in said core and extending outwardly from said hub.

* * * * *